Figure 18:
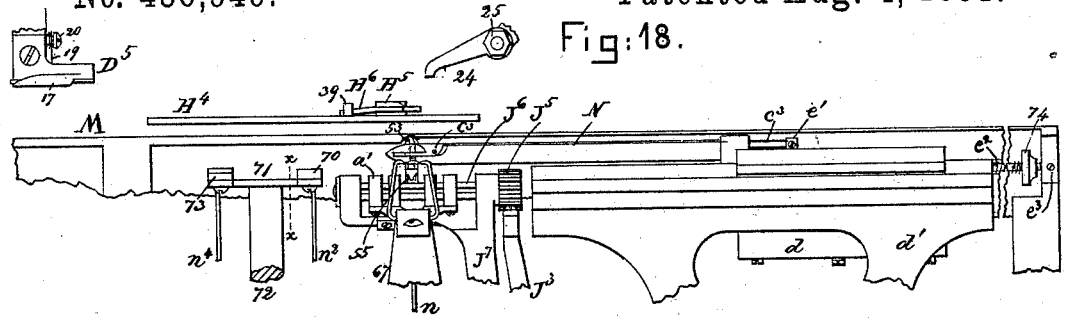

(No Model.)  9 Sheets—Sheet 1.
S. ELLIOTT.
BOOK STITCHING MACHINE.
No. 456,946.  Patented Aug. 4, 1891.
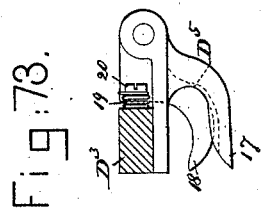
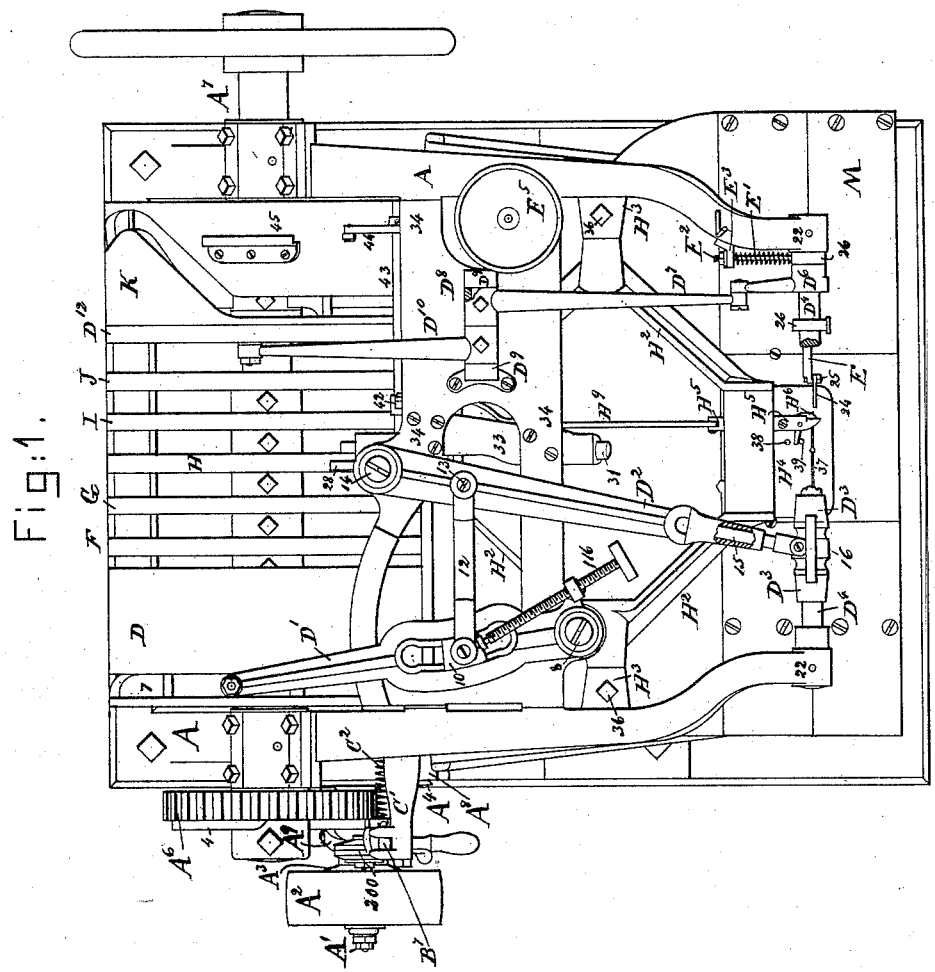
Witnesses
Fred L. Emery.
John F. L. Prindelet
Inventor.
Sterling Elliott.
By Crosby & Gregory attys

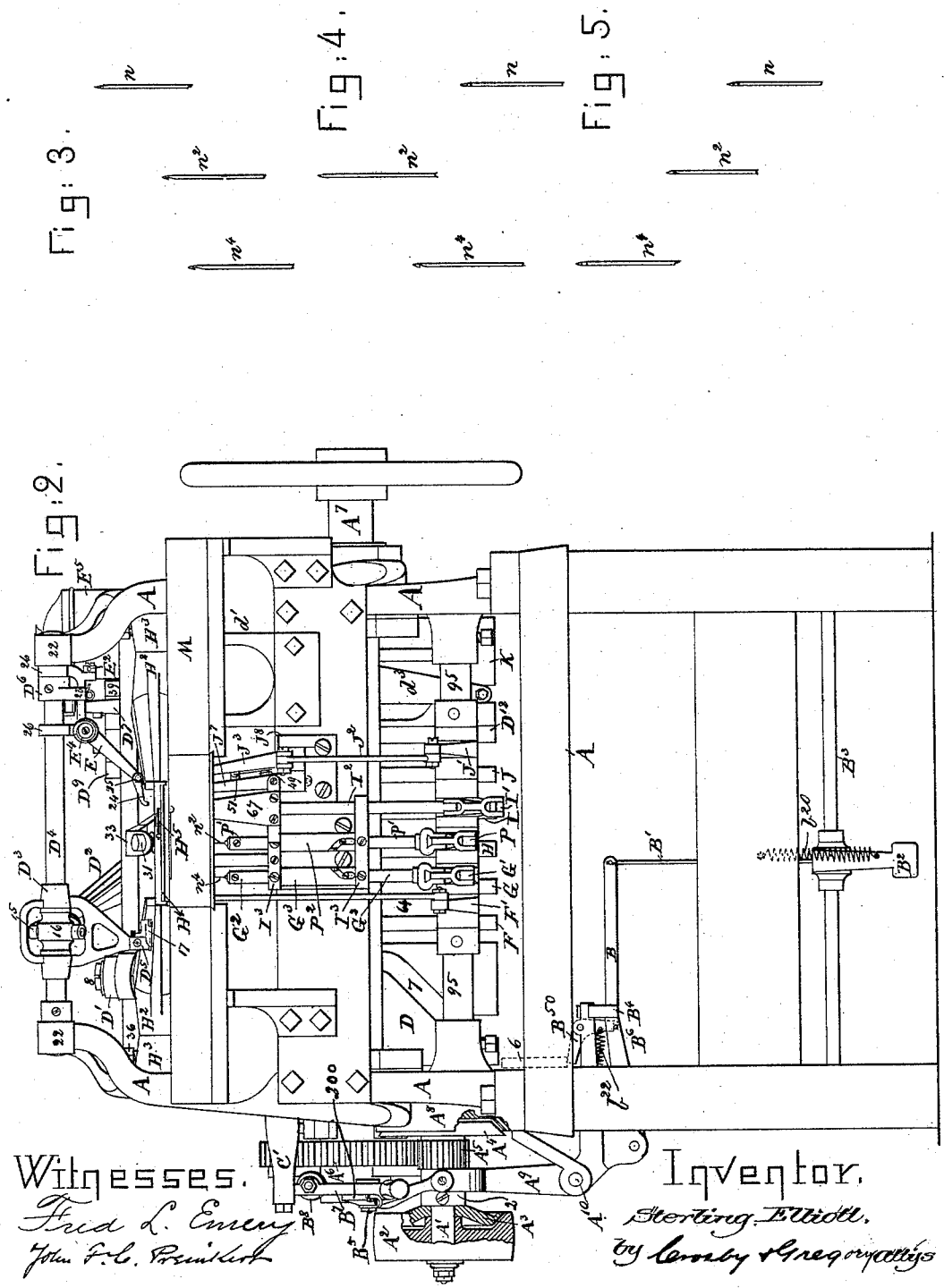

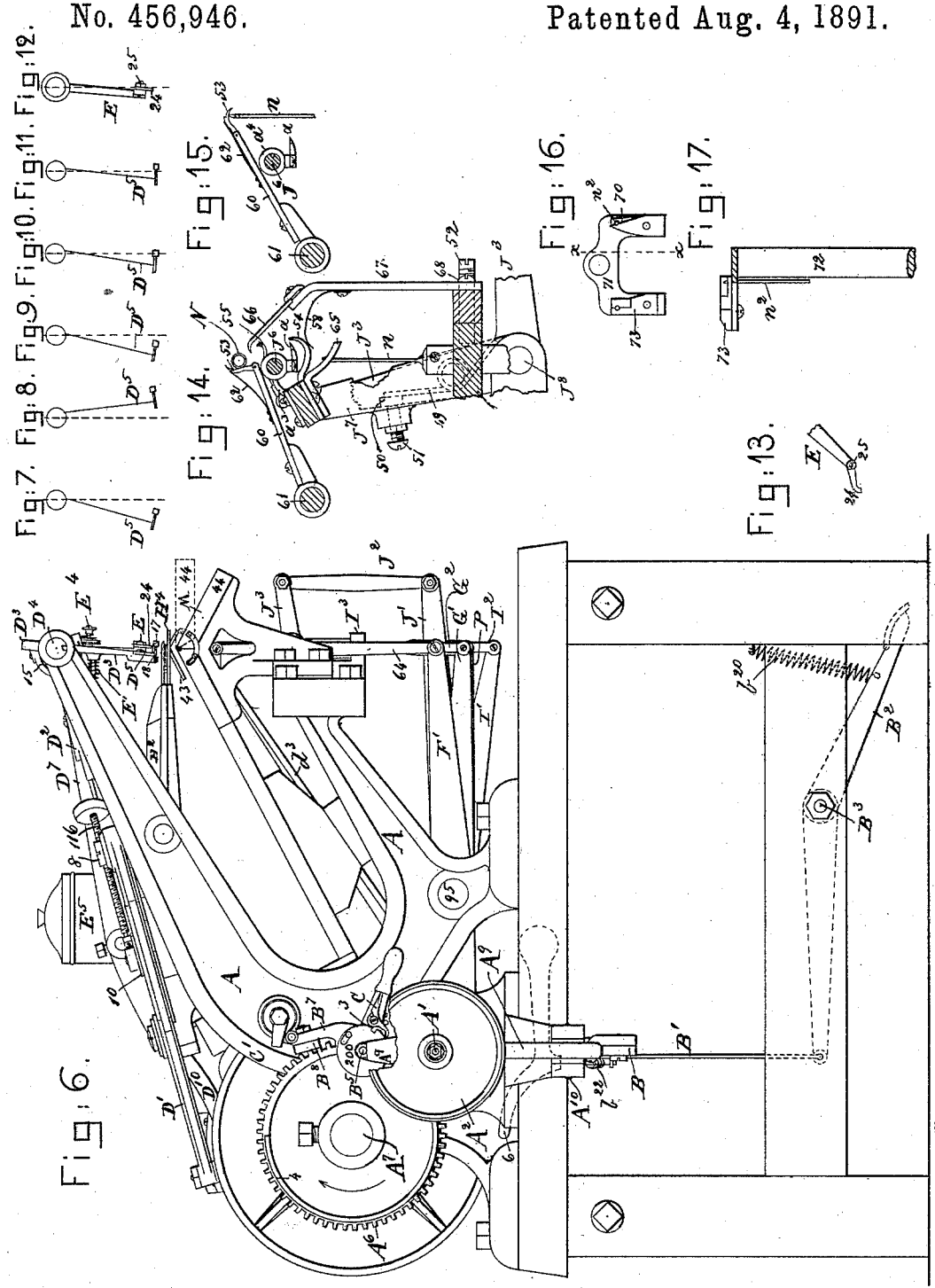

(No Model.) 9 Sheets—Sheet 4.

S. ELLIOTT.
BOOK STITCHING MACHINE.

No. 456,946. Patented Aug. 4, 1891.

Witnesses.
Fred L. Emery
John F. C. Prindler

Inventor.
Sterling Elliott.
by Crosby & Gregory attys.

(No Model.) 9 Sheets—Sheet 5.
S. ELLIOTT.
BOOK STITCHING MACHINE.
No. 456,946. Patented Aug. 4, 1891.
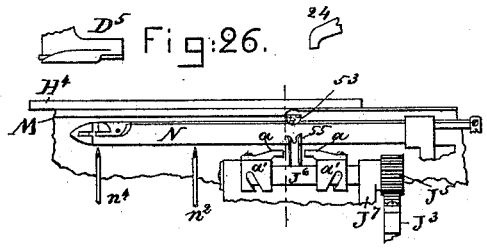
Fig. 26.
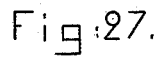
Fig. 27.
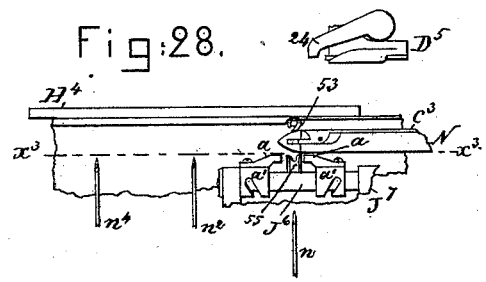
Fig. 28.
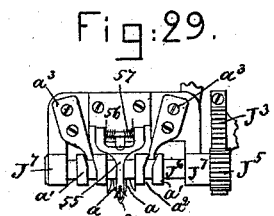
Fig. 29.
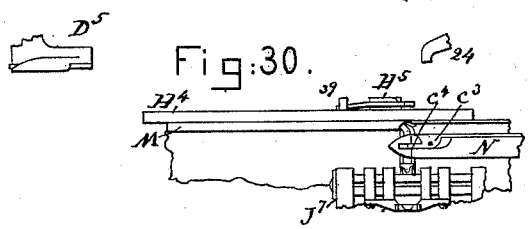
Fig. 30.
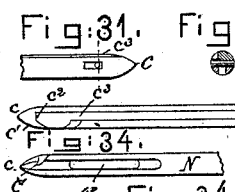
Fig. 31. Fig. 32. Fig. 33.
Fig. 34. Fig. 34A.
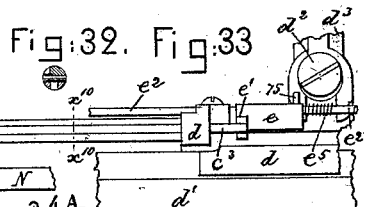
Fig. 37.
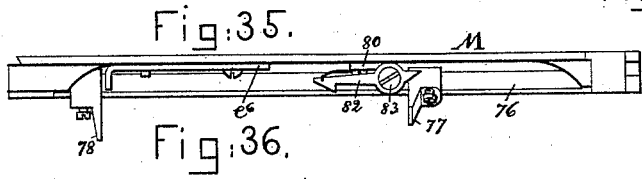
Fig. 35.
Fig. 36.
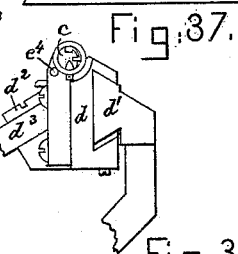
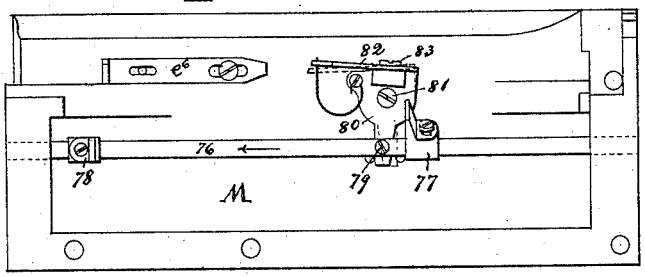
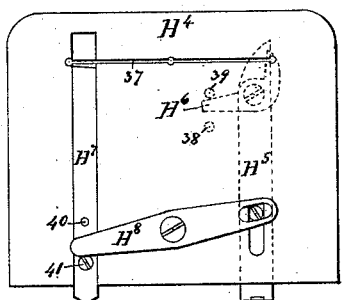
Fig. 38.
Witnesses.
Fred L. Emery
John F. C. Prindlock
Inventor.
Sterling Elliott.
by Crosby & Gregory attys.

(No Model.) 9 Sheets—Sheet 6.

S. ELLIOTT.
BOOK STITCHING MACHINE.

No. 456,946. Patented Aug. 4, 1891.

Witnesses.
Fred L. Emery
John F. C. Prentiss

Inventor.
Sterling Elliott.
by Crosby & Gregory attys (No Model.) 9 Sheets—Sheet 7.
S. ELLIOTT.
BOOK STITCHING MACHINE.
No. 456,946. Patented Aug. 4, 1891.
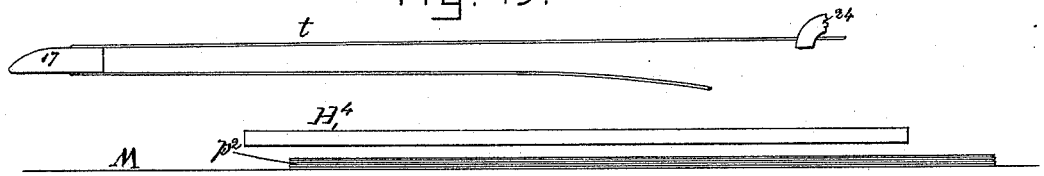
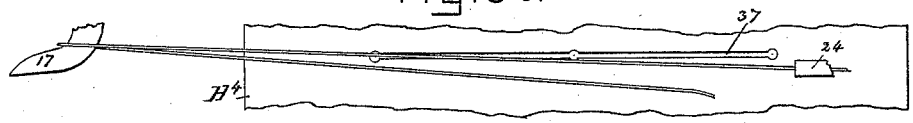
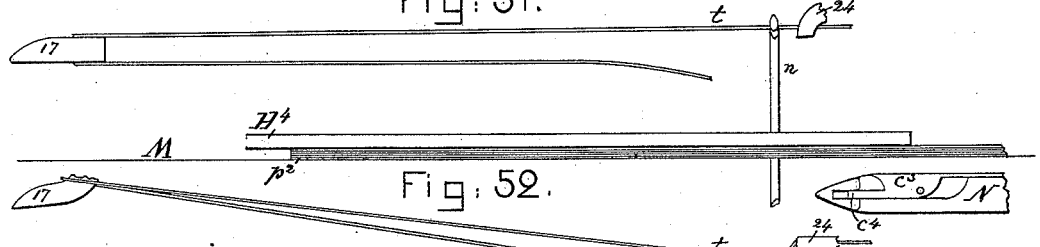
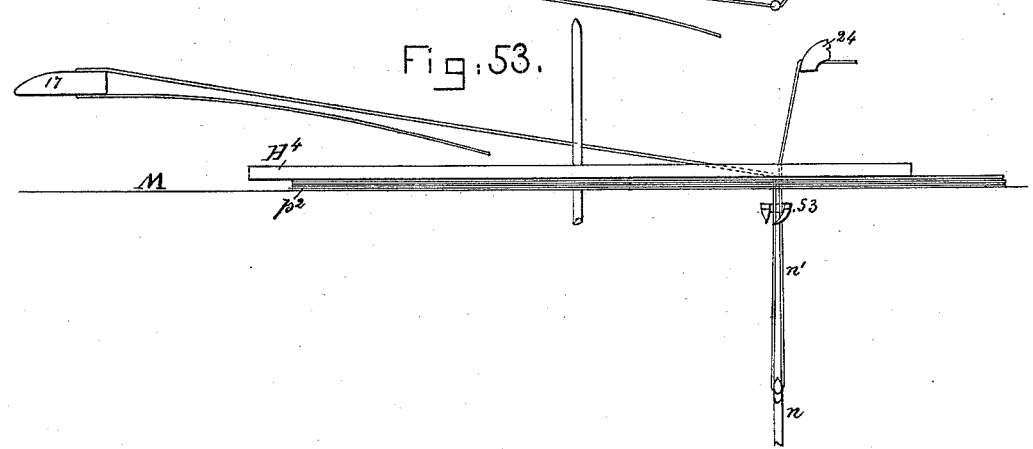
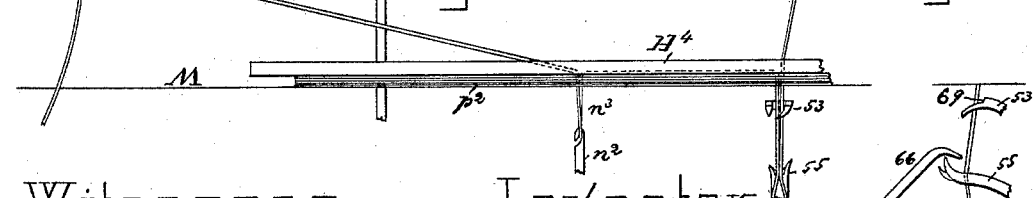
Witnesses. Inventor.
Fred L. Emery. Sterling Elliott.
John F. C. Prindlet. By Crosby & Gregory attys.
THE NORRIS PETERS CO., PHOTO-LITHO., WASHINGTON, D. C.

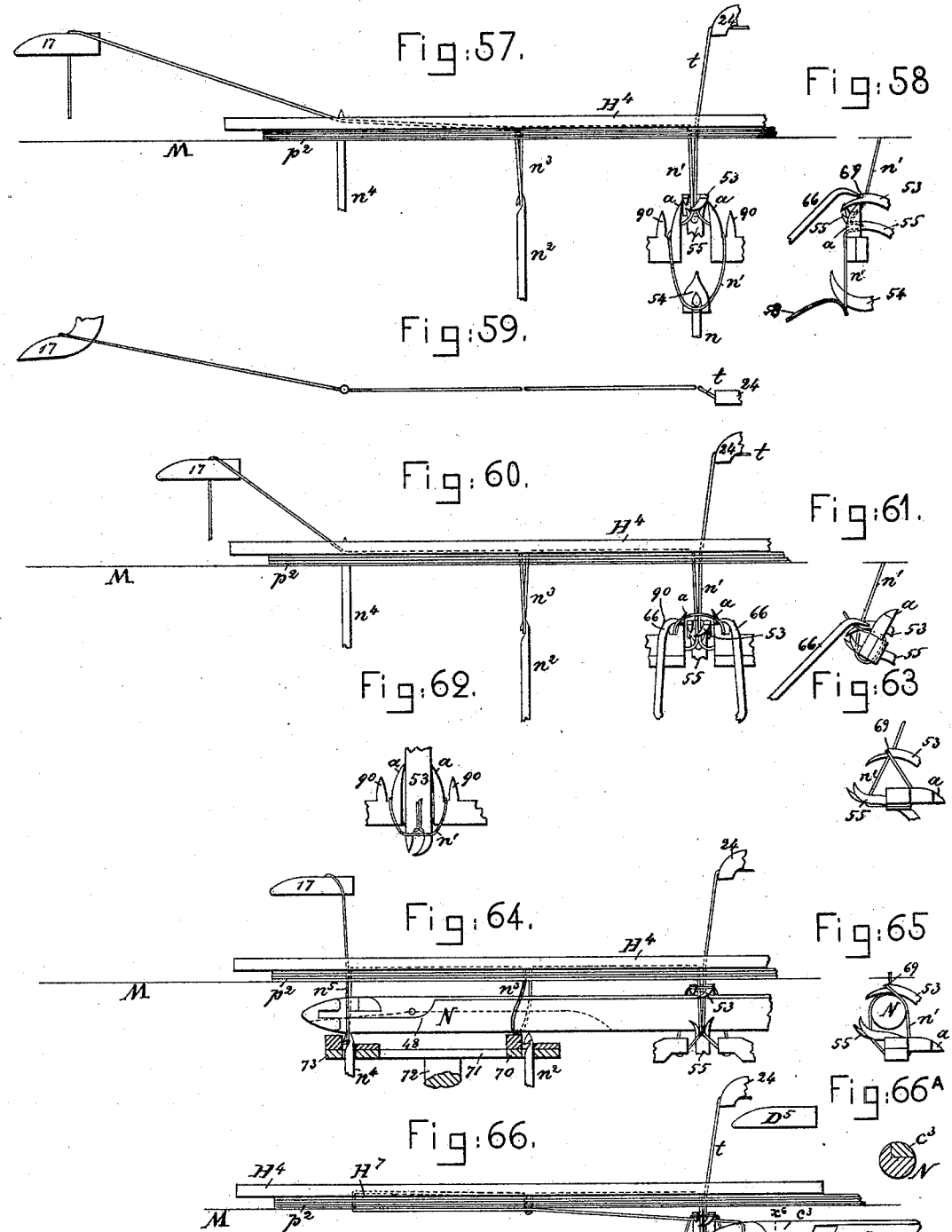

(No Model.) 9 Sheets—Sheet 9.
S. ELLIOTT.
BOOK STITCHING MACHINE.
No. 456,946. Patented Aug. 4, 1891.
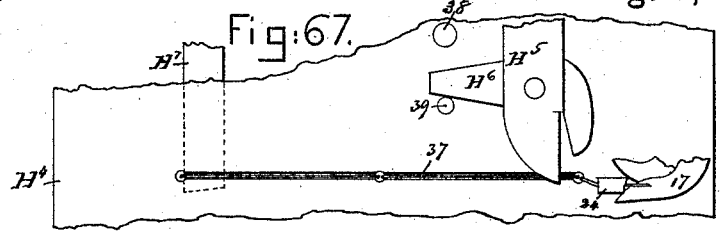
Fig. 67.
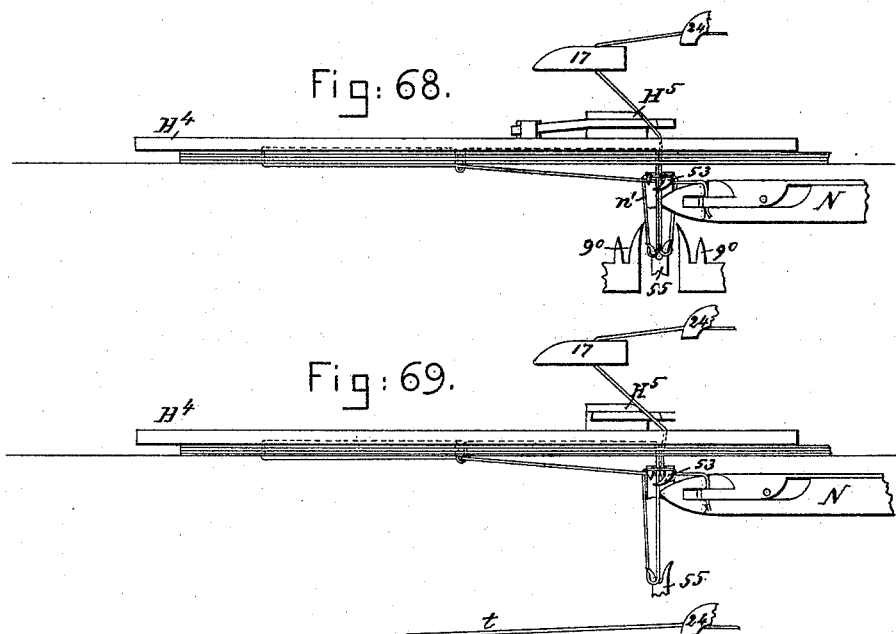
Fig. 68.
Fig. 69.
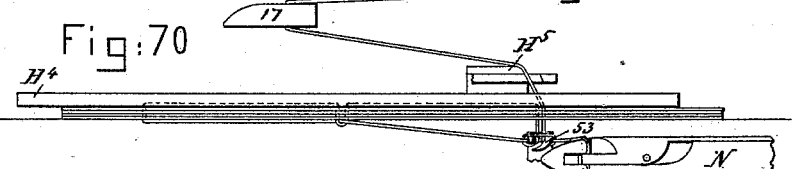
Fig. 70.
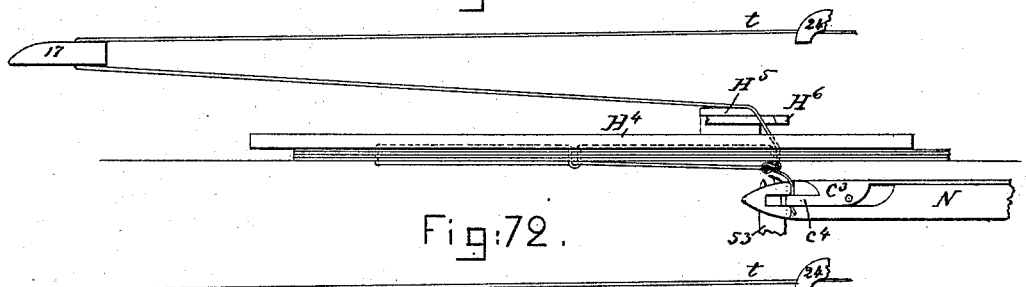
Fig. 71.
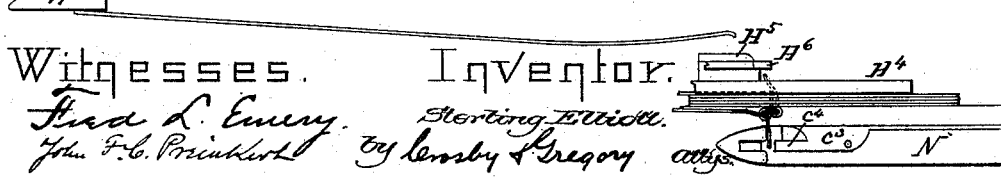
Fig. 72.
Witnesses. Inventor.
Fred L. Emery. Sterling Elliott.
John F. C. Prinkert. by Crosby & Gregory attys.

UNITED STATES PATENT OFFICE.

STERLING ELLIOTT, OF WATERTOWN, MASSACHUSETTS.

BOOK-STITCHING MACHINE.

SPECIFICATION forming part of Letters Patent No. 456,946, dated August 4, 1891.

Application filed April 5, 1886. Serial No. 197,832. (No model.)

*To all whom it may concern:*

Be it known that I, STERLING ELLIOTT, of Watertown, county of Middlesex, State of Massachusetts, have invented an Improvement in Pamphlet-Stitching Machines, of which the following description, in connection with the accompanying drawings, is a specification, like letters and figures on the drawings representing like parts.

This invention relates to improvements upon Letters Patent of the United States No. 263,031, granted to me August 22, 1882, the mechanism being adapted to make the particular stitch described in United States Patent No. 237,966, dated February 22, 1881, to both of which reference may be had.

In my improved machine I have materially simplified the mechanical devices which co-operate in the formation of the knot, and have reduced their number and materially simplified their movements, thus greatly increasing the speed of operation as compared with the machines referred to, and with less expenditure of power.

In my improved machine the sheets to be stitched are laid upon a table and clamped thereon, while hooked needles—two or more—are made to penetrate, one after the other, the said sheets. In the machine herein illustrated three hooked needles are employed, and in operation they are thrust through the sheets one after the other, as will be described, and are supplied, one after the other, with thread from a traveling thread-carrier, which, in addition to its movement in the direction of the length of the stitch, has a vibrating movement to correctly present its thread to be engaged by the hooks of the descending needles, and, as herein shown, the hooks of the said needles normally point in opposite directions, to thus lessen the number of vibrations of the thread-carrier during the completion of each stitch. Two of these needles, besides having a movement of reciprocation in a straight line, make also a partial rotation about their longitudinal axes to thus enable the loops held by them to be cast off upon the shank of a reciprocating lacing-hook, which is passed through all the loops, the first loop having been previously spread and doubled upon itself, and engages the last loop which was formed, a clamp forming a part of the interlacing-hook grasping the said last loop as the interlacing-hook, having been passed through it in its forward movement, starts to return, the said interlacing-hook thus drawing the said loop and the free end of the thread, held above the sheets as a short length, down through the sheet to its then under side, and then through the remaining loops, forming at what is called the "first needle" a knot and completing the stitch.

By the term "stitch" I mean to include all the thread used to unite the superimposed sheets of one pamphlet, and the said stitch may extend through the said sheet a greater or less number of times, according to the number of needles.

The longitudinal movement of the thread-carrier in the direction of the stitch is made adjustable in accordance with the thickness of the material being united, and a sufficient quantity of thread for the next stitch to be made is measured off by the thread-carrier as the stitch last made is tightened or completed, and before the said thread is cut off the said carrier takes thread first from the loops previously made, and then the remainder of the length of thread required for the next stitch is taken from the thread-guide and tension device. The thread so measured off and cut will thereafter be delivered to the needles in succession, it being drawn through the thread-carrier, which preferably will be drawn backward more slowly than the thread, thus keeping the thread taut and enabling it to be drawn into loop form by the first and succeeding needles, each needle taking, one after the other, its proper proportion of said thread and drawing it through the sheets for the formation of loops of the proper size. Co-operating with the first needle are a loop-spindle cast-off, needle-guide, loop-turners, loop-contractor, loop-receiver, loop-retainer, and interlacing-hook, as will be described.

The special features wherein my invention consist will be hereinafter described, and pointed out in the claims at the end of this specification.

Figure 19:
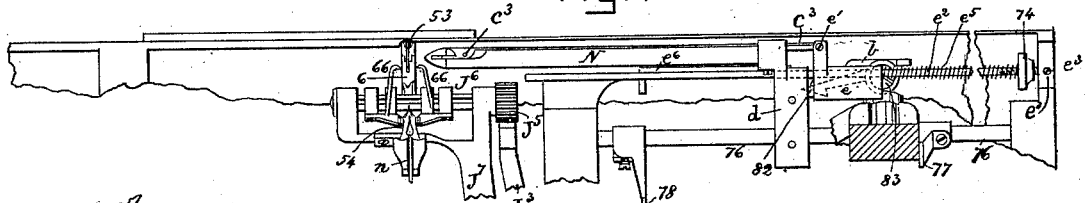
Figure 20:
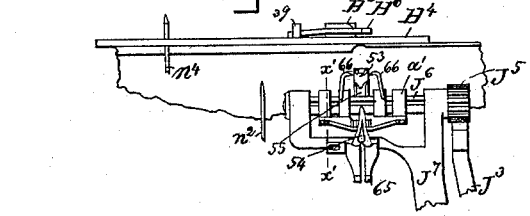
Figure 21:
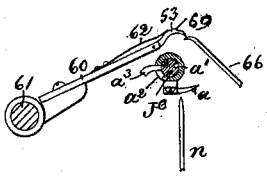
Figure 22:
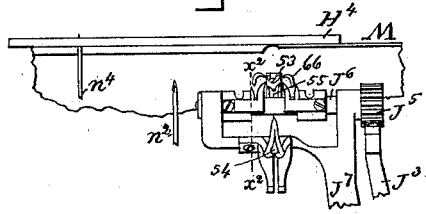
Figure 23:
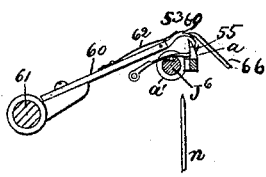
Figure 24:
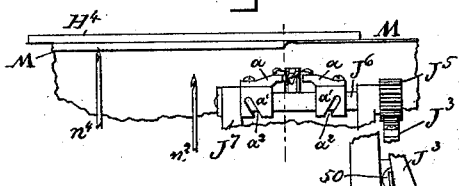
Figure 25:
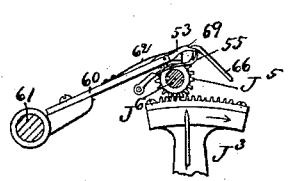

Figure 1 is a top view of a pamphlet-stitching machine embodying my improvements, part of the rod $D^4$ being broken away to show parts under it. Fig. 2 is a front side view thereof. Figs. 3, 4, and 5 are diagrams representing different positions of the needles in the formation of a stitch. Fig. 6 is a left-hand end elevation of Fig. 1, partially broken out to show the tripping mechanism. Figs. 7 to 11 are diagrams representing different positions of the thread-carrier as it is vibrated to present the thread to the hooks of the needles. Fig. 12 is a detail representing in end view the thread-guide; Fig. 13, a front view of the same. Fig. 14 is a vertical sectional detail taken at the left of the first needle and showing it and its co-operating devices for spreading and bending the first loop back upon itself to form a knot, the said parts being in what I shall term their "first" position, or in position ready to start to make a stitch. Fig. 15 is a detail showing the first needle partially elevated, some of its co-operating devices having been changed in position. Fig. 16 is a detail showing a top view of the combined guide and hook-closer for the second and third needles; Fig. 17, a section of Figs. 16 and 18 on the dotted line $x\,x$. Fig. 18 is a detail in front view, the front of the table being broken away to show the interlacing-needle, the parts co-operating with it to form the first loop into a knot, the needles, the clamp, and parts of the thread-guide and thread-carrier, the parts being in the same position as in Fig. 14. Fig. 19 shows the part of Fig. 18 below the table, but in changed position, the position being substantially that of Fig. 15, part of the frame-work shown in Fig. 18 being broken out to show parts behind it instrumental in operating the lacing-needle; Fig. 20, a detail of what I shall call the "sixth" position of the knot-tying mechanism and needles; Fig. 21, a section of Fig. 20 in the line $x'\,x'$; Fig. 22, the same parts in what I shall call their "seventh" position; Fig. 23, a section thereof in the line $x^2\,x^2$; Figs. 24 and 25, respectively, a detail and section thereof showing the same parts in their eighth position; Figs. 26 and 27, detail and section thereof of the parts in their ninth position; Fig. 28, detail in tenth position; Fig. 29, a section of Fig. 28, showing the parts below the dotted line $x^3$; Fig. 30, detail to show the knot-tying devices in their eleventh position. Figs. 31 to 34 are respectively a rear side view of the front end of the interlacing-hook, a section thereof, a top view, and a partial under side view to be described. Fig. 34$^a$ is a section of Fig. 33 in the dotted line $x^{10}$. Figs. 35 to 37 are details of devices for actuating the interlacing-hook and its jaw; Fig. 38, an under side view showing in detail the thread-rest over which the thread is drawn to prevent it leaving the paper, and of the thread-cutter, over which also the thread is tightened, as will be described. Fig. 39 shows developed the cam which reciprocates the thread-carrier. Fig. 40 shows the said cam in side elevation, together with a lever moved by it, which forms part of the tripping mechanism; Fig. 41, a detail showing the cam and part of the devices which operate the loop-receiver, one of the devices to be used in the formation of the knot; Fig. 42, a detail showing the cam and part of the devices for operating the third needle; Fig. 43, a detail of the cam and some of the devices which actuate the second needle and the presser-plate; Fig. 44, a detail of the cam and some of the devices for actuating the first needle; Fig. 45, a detail showing the cam and some of its co-operating devices for operating the loop-turners; Fig. 46, a detail showing the cam and some of its co-operating devices to vibrate the thread-carrier. Fig. 47 shows developed the cam which operates the interlacing-hook. Fig. 48 shows the same cam in side elevation, together with devices instrumental in operating the thread-cutter. Figs. 49 to 72, inclusive, are details representing different positions or various parts of the machine to fully explain the manipulation of the thread to form the stitch and tie the knot; and Fig. 73 is an enlarged detail in top view of the thread-carrier.

The frame-work A, of suitable shape to sustain the working parts, has a stud A', on which is placed loosely a belt-pulley $A^2$ and a friction-disk $A^3$, having an attached sleeve provided at its inner end with a second disk $A^4$. The sleeve has fast upon it between these disks a pinion $A^5$, which meshes with the gear $A^6$ on the cam-shaft $A^7$, the said pinion driving the said gear and cam-shaft when the disk $A^3$ is forced in contact with the continuously-rotated pulley $A^2$ and locking or preventing rotation of the said gear and cam-shaft when the disk $A^4$ is pressed against the stationary friction-plate $A^8$. The said sleeve is embraced by a loose collar 2, placed between the disk $A^3$ and pinion $A^5$, and the collar is engaged by one end of an elbow-lever $A^9$, pivoted at $A^{10}$. This elbow-lever has pivoted to its under side an auxiliary lever B, (see Fig. 2,) connected by a link B' with foot-treadle $B^2$ on a rod $B^3$. The upper end of the lever $A^9$ is provided with an elbow-shaped branch $B^7$, pivoted thereon at $B^5$, the upper end of the said branch having a roller $B^8$, while the lower end of the said branch is made as a handle and provided with a spring-actuated catch which engages a notch in the enlarged upper end of the lever $A^9$. The upper end of the branch $B^7$ is placed near the notch in the holding device C', fast to the frame-work, and when the said upper end is engaged with the said notch, as in the drawings, both plates $A^3$ and $A^4$ will be removed from contact with the pulley and brake and the machine will be free to be moved by hand.

To start the machine, the operator will engage the handle part of the branch $B^7$, will lift the same, turn the branch, disengage it from the holder C', and the catch C (see Fig. 6) will be so moved as to engage the notch 3 in the enlarged upper end 200 of the lever $A^9$, (see Fig. 6,) thus placing and holding the roller $B^8$ in the range of movement of the cam-ledge 4 of the gear $A^6$, and at the same time the spring $C^2$, connecting the branch and frame-work, acts to pull the sleeve in the direction to engage the disk $A^4$ with the brake $A^8$, thus locking the machine.

To start the machine and drive it by power from the continuously-rotated pulley $A^2$, the operator will put a foot upon the treadle $B^2$ and by the rod $B'$ will elevate the inner end of lever B, and it, by its connected pin $B^6$, acting on the notched end of the elbow-shaped catch $B^{50}$, will turn the lever $A^9$ in the direction to move the sleeve and its attached disk $A^3$ into engagement with the pulley $A^2$ and at the same time remove the disk $A^4$ from the brake $A^8$, and as the machine starts the cam-ledge 4 of the gear $A^6$ acts against the roller $B^8$ and holds the lever $A^9$ in position to insure the rotation of the shaft $A^7$ sufficiently far to complete a stitch. As soon as the ledge 4 acts upon the roller $B^8$, the cam D in its movement causes its tappet 5 to act upon the lever 6 (see Fig. 40 and dotted lines, Figs. 2 and 6) and depress it so that the said lever strikes the upper end of the catch $B^{50}$, turns and disengages the same from the pin $B^6$ of the lever B, thus leaving the parts in condition to be automatically stopped when the roller $B^8$ runs off the ledge 4.

To start the machine again, the operator will lift his foot to permit the spring $b^{20}$ to turn the treadle in the direction to pull down the lever B and allow the spring $b^{22}$, connected with the catch $B^{50}$, to turn the catch into position to engage the pin $B^6$ as the lever B is again raised to start the machine for a second stitch.

The cam D (fully developed in Fig. 39) has a cam-groove 7, which receives a roller-stud of a lever $D'$, having its fulcrum at 8 (see Fig. 1) and provided with a curved slot to receive a block 10, with which is joined a link 12, pivoted at 13 to the lever $D^2$, which in turn is pivoted at 14 to the frame and connected by a sliding-pin joint 15 (broken out in Fig. 1) with a driving sleeve or hub 16, mounted on an oscillating rod $D^4$ and adapted to bear against the stock of the thread-carrier $D^3$, the said stock being connected with the rod $D^4$ by a spline, (seen in Fig. 6,) so as to slide thereon when acted upon by the hub 16, moved by the lever $D^2$. The slot in the lever $D'$ has its center of curvature at 13 when the levers $D'$ and $D^2$ are in their farthest position to the right, viewing Fig. 1, so that when the block 10 is adjusted in the said slot by the screw 116 to vary the throw of the lever $D^2$ and the extent of reciprocation of the thread-carrier, the latter will always come back to the same starting position, but may be turned forward for a greater or less distance, according to the amount of thread which it is desired to throw off for the next stitch, such variation in throw being, however, always beyond the third or last needle $n^4$, used in making the stitch.

The thread-carrier $D^5$ (best shown in Figs. 2, 6, and 18, and in top view, Fig. 73, on a larger scale) is composed of a stationary hook 17 and arm 18, pivoted thereon and acted upon at one end by a spring 19, (shown as a spiral spring,) held in place by a screw 20, the end of the said spring opposite the end of the said arm 18 entering a hole in the stock $D^3$ of the thread-carrier, the hook and spring-pressed arm 18 forming a pair of jaws which are normally held pressed together by the said spring 19, the said jaws receiving between them and holding the thread under a certain amount of pressure, while the needles act upon the thread to draw it away from the carrier. The rod $D^4$ is held loosely in bearings in the ends of the brackets or overhanging arms 22, fast on the frame-work, (see Figs. 1 and 2,) and has rigidly connected with it an elbow-lever $D^6$, the longer arm of which is jointed to the arm $D^7$ of a rocking lever composed of the arms $D^7 D^{10}$, the hubs of the said arms being attached by set-screws to a stud $D^8$, placed loosely in the bearings $D^9$. The said rocking lever at its rear end has a roller-stud, which enters a cam-groove in the side of the disk $D^{12}$ and is vibrated thereby, thus turning the elbow-lever $D^6$ and partially rotating the rod $D^4$, to thereby vibrate the thread-carrier during its sliding movements on the rod, in order that the said thread-carrier as it passes the needles will press the thread $t$ to the right or left against the shanks of the said needles, they being at such times up through the sheets to be united, so that the hooks of the said needles, as the latter are drawn down, will engage the thread $t$, held by the carrier, and draw the thread in loop form through the sheets, the direction in which the thread-carrier will be vibrated to press the thread $t$ against the needles depending upon which side of the needle is provided with the hook. As herein shown, three needles being used, the hooks of the first and third needles to be operated are pointed in the same direction, but opposite that of the hook of the second needle when the said hooks are elevated, such arrangement of the hooks simplifying the movement of the thread-carrier.

The thread-guide E, herein shown as provided with a detachable end 24, having an eye for the passage through it of the thread, is attached thereto by a bolt and nut, as shown at 25, has hubs 26, which surround loosely the rod $D^4$, in order that the said rod may be rotated without vibrating the thread-guide; but the latter is vibrated to throw the thread $t$ into the hook of the first needle $n$ prior to drawing down the first loop $n'$ of the stitch made from thread $t$. This vibration of the thread-guide is accomplished by the arm 23 of the elbow-lever $D^6$, which strikes the said thread-guide at the proper time. The return movement of the thread-guide E in opposition to the action of arm 23 is produced by a spring $E'$ on a rod or link $E^2$, connected at one end with the stock of the thread-guide, (see Fig. 2,) the said rod being extended through the said spring and through a lug $E^3$ and having a nut applied to it to prevent the outward movement or vibration of the thread-guide E farther than is desired.

The thread-guide E is provided with a tension device $E^4$, of usual construction, shown as disks acted upon by an adjustable spring, the thread $t$ being passed between the said disks. The thread will preferably be taken from a ball or cop arranged in a case $E^5$, and between the said case and the tension device the thread will be led through suitable guide-eyes.

Cam H has a projection 28, which acts on a stud 29, (see detail, Figs. 43 and $43^a$,) mounted on the head 30 of a slide-rod 31, guided in guides 32 of a guide-box 33, attached to the rigid cross-bar 34, the said projection 28 moving the slide-bar outward, a spiral spring 35 moving it in the opposite direction to keep the roller against the projection. The roller 29 enters an oblique slot made in the ear $H'$, of a yoke-shaped lever $H^2$, having hubs which are placed in journals held in projections $H^3$ of the frame 22 by a set-screw 36. The front portion of the yoke-shaped lever $H^2$ has connected with it the presser-plate $H^4$, which is provided with a slot 37 (see Figs. 1, 38 and 50) as long as the stitch to be made, the said slot being enlarged at points where the needles $n$ $n^2$ $n^4$, called the "first," "second," and "third" needles, are to rise through the said slot.

The paper of the pamphlet to be stitched will vary in thickness and in numbers of sheets, and the presser and its actuating mechanism must be such as to enable the presser to be raised always to a certain height and to stop at a variable point in its descent, according to the thickness of the pamphlet. The spring 35 on the rod 31 provides for this variation, for the said spring forces the stud 29 backward in the oblong slot of the ear $H'$ and lifts the rear end of the presser-carrying yoke $H^2$, and thus depresses the presser $H^4$ on the pamphlet. The thicker the pamphlet the less the movement of the roller 29 backward under the strain of the spring.

The presser-plate—a flat steel plate—has at its upper side a thread-cutting device, herein shown as shears composed of a sliding bar $H^5$, (see Figs. 1, 38, and 67 to 72,) and a movable blade $H^6$, pivoted thereon, the said blade being opened and closed by its contact, respectively, with the pins 38 and 39. The pins 38 and 39 are at a sufficient distance apart to permit the opened shears to be moved partially forward without being closed, thus enabling the end of the bar $H^5$ to be slipped across the slot 37 in front of the thread-guide E while the thread-carrier is being moved away from the thread-guide, the said bar at such time serving as a rest (see Figs. 67 and 72) over which such portion of the thread $t$, drawn down by the first needle $n$ and not needed in the knot, may be drawn and taken up by the carrier, the end of the bar $H^5$ also preventing the thread $t$, as the stitch is tightened, from being drawn so as to tear or cut into the paper. At its under side the presser plate is provided with a slide-bar $H^7$, actuated by lever $H^8$, connected by a pin and slot with the slide-bar $H^5$. The bar $H^7$ has two pins 40 41, between which the end of the lever $H^8$ rests, so that the bar $H^7$ will not be drawn inward during the first part of the outward movement of the bar $H^5$, which thus enables the bar $H^7$ to remain out and stand across slot 37 while the thread $t$ is being drawn by the interlacing-hook N to take up the loop made by the second needle, and while the thread drawn down by the third needle is being drawn by the interlacing-hook into and through the loop made by the second needle the bar $H^7$ prevents the thread drawn down by the third needle from cutting into the pamphlet. In Fig. 66 the bar $H^7$ is shown by heavy black line as in such position, the thread being drawn about it. The bar $H^5$ is connected by link $H^9$ (see Figs. 1 and 48) with an arm 42 of a rock-shaft 43, having a second arm 44, which is acted upon by a tappet 46 when it is desired to move the bar $H^5$ forward, and thereafter by a wing-cam 45 to draw the said bar backward, the said cams being attached to the cam K and acting upon a roller-stud of the arm 44.

The pamphlet $p^2$ to be stitched is laid upon a table M, preferably made V-shaped, as shown best in Fig. 6, to thus enable creased sheets of the pamphlet to be correctly centered and stitched on the said crease. The under side of the presser-plate $H^4$ will have attached to it a correspondingly-shaped foot 43, (shown only in Fig. 6 to avoid confusion;) but in case a folded pamphlet is to be stitched through and through or from outer side to outer side, or several superimposed signatures are to be united for magazine-work, the foot 43 will be removed and the portion 44 of the table M will be elevated, as shown only in dotted lines, Fig. 6, there being a suitable joint for such purpose between the two parts of the said table. The cam I (see Figs. 1, 2, and 44) by its groove causes the vibration of the lower $I'$, which is connected by a link with the lower end of the needle-bar $I^2$, which carries the first needle $n$, the said needle-bar being guided in holes in a cross-bar $I^3$, the same bar serving to guide all the needle-bars. The cams H and G, as to the shape of the grooves in their sides, are substantially alike, (see Figs. 42 and 43,) and they operate, respectively, the levers P and $G'$, each connected by a swivel and link with the lower ends of the two needle-bars, $P'$ and $G^2$, provided, respectively, with the two hooked needles $n^2$ and $n^4$, the said needle-bars provided with pins, being extended, respectively, through sleeves $P^2$ and $G^3$, provided each with a groove suitably shaped to receive the said pins and cause the needle-bars to turn one-fourth around as they are reciprocated, in order to present the hooks of the needles, when above the table, in proper position to take the thread $t$ from the thread-carrier and when below the table to present the loops drawn down by them in proper position to be entered by the interlacing-hook N. The cam-groove of cam H is so shaped at 47 (see Fig. 43) as to cause the second needle $n^2$ to be lifted a little after it has been drawn down with its loop $n^3$, the said needle at such time entering a slot 48 (see Fig. 34) in the interlacing-hook, the needle by such movement disengaging its hook from the said loop as the interlacing-hook is being passed through it, leaving the said loop $n^3$ upon the interlacing-hook, while the needle $n^2$ is again quickly drawn down, as in Fig. 64. Cam J by its groove (see Fig. 45) actuates a lever J', connected by link $J^2$ with one arm of an elbow-shaped sector $J^3$, having its fulcrum at $J^8$ and engaging at its upper end a pinion $J^5$, fast to a short shaft $J^6$, supported in bearings at the upper end of a vibrating frame $J^7$, (see Figs. 18 to 24,) it also having its fulcrum at $J^8$. (See Figs. 2 and 14.) The sector-lever $J^3$ is loose on the fulcrum $J^8$, and the frame $J^7$ at its side next the lever $J^3$ (broken off in Fig. 14) has a stud on which is placed a spring 49, (shown in dotted lines, Fig. 14, and in full lines, Figs. 2 and 24,) which at its upper end bears against the front side of a lug 50, attached to the lever $J^3$. The normal position of the lever $J^3$ is with the lug 50 against the adjustable stop 51, connected with frame $J^7$. As the lever $J^3$ is moved in the direction of the arrow shown in Fig. 25, it, by the action of the lug 50 on the spring 49, carries the frame $J^7$ forward in unison with it until the frame $J^7$ strikes the adjustable stop 52, attached to some rigid part of the frame-work, when the further movement of the frame $J^7$ is arrested; but the lever $J^3$ continues to move, and in so doing its sector-teeth, in engagement with the pinion $J^5$, rotate the shaft $J^6$ and with it the loop-turners $a\ a$, attached by suitable screws to hubs $a'$, which are splined on the shaft $J^6$, so as to rotate with and slide thereon, the said hubs being slotted at $a^2$ to receive suitable studs $a^3$, (see Fig. 29,) secured to the top of the frame $J^7$, the said studs so entering the said grooves causing the hubs $a'$ and their attached loop-turners to slide longitudinally with relation to the shaft $J^6$ as it is rotated as described, the said loop-turners being moved away from each other by the rotation of shaft $J^6$ after the outward movement of frame $J^7$ is arrested, and being moved toward each other during the first part of the backward movement of the sector-lever $J^3$, it acting to rotate the shaft $J^6$ until the lug 50 strikes the stop 51, after which the lever $J^3$ and frame $J^7$ move backward in unison, the hook of the first needle $n$ having been supplied with thread by the bar 24 of the thread-guide E, which is then vibrated for such purpose and drawn down to form the first loop $n'$, (see Fig. 53,) and between the horns of the loop-receiver 53, to be described, and the needle stops with the loop directly in front of the rigid combined loop spreader and cast-off 54, (see Figs. 14 and 55,) attached to the frame $J^7$, and in this condition the frame $J^7$ is moved forward until the loop-spreader 54 enters the said loop, and as the frame $J^7$ is so moved forward the loop-contractor 55, made as a forked arm, (see Figs. 29 and 64,) hinged to a plate 56, attached to the frame $J^7$, and normally held down against shaft $J^6$ by a spring 57, straddles the loop at some distance above the needle $n$, (see Figs. 55 and 56,) and the points of the loop-turners $a$ also enter the said loop. In this condition the needle $n$ remains stationary, while the second needle $n^2$, having been supplied with thread by the thread-carrier, is drawn to its lowest position to form loop $n^3$, at which time the first needle $n$ is sufficiently elevated by the actuating-cam I so as to enter the hole 59 (see Fig. 55) in the combined spreader and cast-off 54, as in Fig. 55, thus casting off the loop $n'$, which latter is retained on the said spreader by the spring 58, attached to the frame or other rigid portion. (Seen in Fig. 14.)

The loop-receiver 53 (see Figs. 14 and 21 to 25) is joined to an arm 60 of a rock-shaft 61 and is acted upon by a spring 62. This rock-shaft 61 has an arm (see Fig. 41) which is connected by link 64 with the lever F', acted upon by the cam F. Before the sector-lever $J^3$ commences to rotate the shaft $J^6$ the loop-receiver 53 is depressed, as shown in Figs. 57, 58, and 60, to place its forward end sufficiently low to receive upon it the loop $n'$ when it is elevated or turned up by the loop-turners $a\ a$, the said loop-turners commencing to turn up through the loop $n'$ after the said loop has been cast off the needle $n$ and as the said lever J commences to move forward independently of the frame.

Fig. 14 shows the parts in the position which they will occupy when the presser is raised ready for the insertion below it of a pamphlet to be stitched; and Fig. 15 is a diagram to show the relative positions of the loop-receiver, the shaft $J^6$, loop-turners, and needle $n$ just as the said needle is in position to penetrate the pamphlet. The needle $n$ ascends to its highest point, as shown in Fig. 51, when it takes the thread from the arm 24 of the thread-guide E, the latter being swung laterally, as described, by the arm 23 to press the thread against the said needle, as in Fig. 52. The arm 60 (see Fig. 15) is held up, as therein shown, by its operating devices, previously described, until the needle $n$ has drawn the loop $n'$ to its full length, as in Fig. 53, and the said loop is then entered by the loop-spreader 54, as described, and the needle $n$ rises to cast off its loop. After the loop has been cast off the needle is drawn fully down, as shown in Fig. 14, wherein the needle is shown as in the fork of the centering device 65, to be described. As the needle $n$ descends into its lowest position, or immediately after the loop has been cast off, the loop-receiver 53 is lowered to and made to pass between the points of the loop-detainer 66, secured to the rigid arm 67, attached to the frame-work, (see Fig. 14,) the said loop-receiver meeting and passing down between the arms of the said detainer, as shown, respectively, in Figs. 20 to 25, inclusive.

Referring to Figs. 57 and 58, the loop-receiver is in its lowest position and the needle $n$ has cast off its loop $n'$ on the loop-spreader 54, where it is retained by the spring 58, and in such position the loop-turners $a$ have been moved from their horizontal position, Figs. 14, 15, and 56, into vertical position, and have been separated sufficiently (see Fig. 57) to enable the said loop-turners in their further upward rotation to pass outside the prongs of the loop-receiver 53, the loop-contractor 55, located below the loop-receiver, then standing with the base of its notch, in which the loop rests, at such a distance out toward the front of the machine beyond the center of rotation of the shaft $J^6$ and the shoulders 69 of the loop-receiver 53 as to enable the loop-turners in their further upward rotation (see Figs. 61 and 63) to form a space in the doubled loop from front to back, so that it may be readily entered, as in Fig. 65, by the interlacing-hook N. Immediately after the change of position of the loop-turner from the position Fig. 61 to that of Fig. 63 the loop-receiver 53 is raised, as in Fig. 63, to enlarge the loop, in which position it will be held until it is entered by the said interlacing-hook and until the said hook has been drawn back through it, as will be described, together with the free end of the thread. The needle $n^2$, it will be remembered, was drawn down to form its loop before the needle $n$ was raised to cast off its loop $n'$. The needle $n^4$ draws down its loop $n^5$ before the needle $n^2$ casts off its loop $n^3$. The loops being formed for the reception of the interlacing-hook, the latter is moved forward through the loop $n'$, then doubled and turned over upon itself, as in Figs. 63 to 66, and into the loop $n^3$, turned partially around, as before described, and as the interlacing-hook approaches the said loop the needle $n^2$ rises slightly to open the loop, and thereafter the point of the said needle rises into the groove 48 of the hook N to cast off the loop $n^3$, as shown in Fig. 64, and the said hook in its further forward movement enters the loop $n^5$, previously opened by a slight rise of the needle $n^4$. During the forward movement of the hook into the two loops $n^3$ $n^5$ the loop $n^3$ is retained in the hook of the needle $n^2$ by a guide 70 on a plate 71, mounted upon a rod 72, until the body of the interlacing-hook has entered the said loop and the loop is to be cast off from the needle $n^2$. The needle $n^4$ has cooperating with it a guide 73, also attached to the said plate 71, (see Figs. 16, 17, and 64,) the guide 73, besides guiding the needle, also acting to prevent the loop $n^5$ from being cast off from the needle $n^4$.

The interlacing-hook N consists of a cylindrical rod having a longitudinal groove (see Fig. 34$^a$) at its upper side for nearly its whole length, or to its point $c$, the said rod being cut away at one side near its point (see Figs. 26, 33, and 34) to form a beak $c'$, leaving, however, a vertical wall $c^2$, Fig. 33, between which and the end of a sliding clamp $c^3$ the thread drawn into the opening of the said hook by the needle $n^4$ may be clamped with a determined yet adjustable amount of friction. The sliding clamp $c^3$ has an enlarged head, one side of which (see Fig. 66$^a$, which is a section of Fig. 66 in the line $x^6$) is made to fit against the inner wall of the grooved rod composing the body of the interlacing-hook N, the upper and outer portions of the said head being rounded to correspond substantially with the outline of the hook, the said head having a tongue $c^4$, which enters a corresponding groove made in the front side of the rod forming the body of the interlacing-hook, as shown in Fig. 30, and thus forming a bridge to prevent the loop $n^3$ on the shank of the interlacing-hook from being caught by the beak $c'$ as the interlacing-hook is drawn backward through the loop $n^3$, the said interlacing-hook then holding clamped to it the thread which was drawn down by the needle $n^4$ and delivered to the interlacing-hook, the latter in its backward movement drawing the thread through the hook of the needle $n^4$ and about the rest $H^7$. (See Figs. 38, 66, and 67.)

The rear end of the body of the interlacing-hook is connected with the carriage $d$, mounted on a way $d'$, connected rigidly with the framework. The carriage $d$ has a screw-stud $d^2$, which is embraced by a forked lever $d^3$, pivoted at $d^4$ on a rigid part of the frame-work, (see Fig. 48,) the said lever having a roller-stud which is entered into the groove of the cam K, (shown in Fig. 47,) the carriage being thus reciprocated at the proper time. The sliding clamp $c^3$ is connected to a cross-head $e$ by a pin $e'$, (see Figs. 19 and 33,) and the said cross-head is mounted on a rod $e^2$, attached at its rear end to the frame-work by a screw $e^3$. The front end of rod $e^2$ is extended through a hole $e^4$ (see Fig. 37) in the carriage $d$, the latter thus acting as a support for the front end of the said rod, and between the said cross-head and the frame-work the said rod is provided with a spiral spring $e^5$, which by its action on the cross-head keeps the front end of the clamp $c^3$ normally pressed forward toward the wall $c^2$, so as to clamp the thread, as shown in Fig. 66, and press the cross-head toward the carriage $d$. The tension-spring $e^5$ is adjustably held by a thumb-nut 74. (See Fig. 19.) The cross-head $e$ at its rear side is provided with a projecting pin or stud 75, (see Fig. 33,) which, as the interlacing-hook enters the third loop $n^5$, strikes against an adjustable stop $e^6$, secured to the under side of the table, (see Figs. 19 and 36,) thus stopping the clamp while the interlacing-hook completes its forward movement, which thus unbridges the opening cut through one wall of the body of the interlacing-hook, as described, and permits the thread of the loop $n^5$ to be caught by the beak and be clamped as soon as the interlacing-hook commences to move backward, the needle $n^4$ at such time being drawn slightly down to insure the entrance of the front side of its loop into the space unbridged by the stopping of the clamp $c^3$. As the interlacing-hook recedes it draws the thread $t$ with it through the loop $n^3$, and then in its further movement takes up the said loop, drawing it around the rest 47, and finally drawing the said thread through the double loop $n'$, as shown in Fig. 68, when the movement of the loop-turners $a$ is reversed and they are drawn out from the said loop, leaving it upon the loop-receiver 53 and loop-contractor 55, as shown in the said figure. The right-hand prong of the loop-contractor is turned up the highest, (see Figs. 68 and 69,) so that as the thread-carrier 17, as it starts forward, (it having been moved backward into the position shown in Fig. 67, while the interlacing-hook was being retracted,) will first draw off that prong, as shown in Fig. 69, to thus prevent slack in the thread between the first and second loops. The further forward movement of the carrier 17 then draws the loop $n'$ completely from the thread-contractor and leaves it upon the loop-receiver 53, as shown in Fig. 70, and during a yet further movement of the said carrier the lever 60 is depressed, drawing down the back end of the loop-receiver, as in Fig. 14; but the strain of the loop on the front end of the thread-receiver keeps it up so that the said loop is drawn upward off the points of the loop-receiver, as seen in Fig. 71. While the arm 60 is being depressed the interlacing-hook is moved forward slightly, (see Fig. 71,) thus giving up a little slack in the thread yet held by it to be drawn by the rising loop up into and so as to form a square knot, substantially such as shown in United States Patent No. 237,966, and a yet further forward movement of the interlacing-hook effects the opening of the clamp, as in Fig. 72, by means to be hereinafter described, releasing the end of the thread, leaving the pamphlet stitched and ready to be removed from the table. About as the end of the thread is released from the interlacing-hook the thread-carrier has arrived at its farthest outward position, (see Fig. 71,) and the thread which during the outward movement of the carrier was drawn over the end of the bar $H^5$ strikes the pin 39, closing the blade (see Fig. 38) to cut the thread, the thread-carrier having been moved into such position as to draw from the thread-guide a sufficient length of thread for the next stitch.

As before described, the cross-head $e$, to which the clamp $c^3$ is attached, has a pin 75, which near the forward movement of the interlacing-hook strikes the stop $e^6$ to arrest the movement of the clamp $c^3$, thus opening the said hook for the reception of the loop $n^3$, as previously described; and at such time the end of lever $d^3$ strikes the dog 78 on the loosely-held reciprocating rod 76, having its ends placed in openings in the flanges of and below the table M, (see Fig. 36,) and moves the said rod in the direction of the arrow thereon, and it by the screw 79, connected with the plate 80, pivoted at 81, throws the spring-catch 82, pivoted thereon at 83, into the position shown in said Fig. 36, the said catch at the forward movement of the cross-head having been out of range of the pin 75. As the cross-head $e$ is moved backward to place the interlacing-hook in the position shown in Figs. 68 to 70 the pin 75 passes under and lifts the catch 82, but does not move the plate 80, and during the forward movements of the carriage $e$, as described, to place the interlacing-hook in the position Fig. 71 the said plate is not moved; but at that partial forward movement of the interlacing-hook to place it in the position Fig. 72 the pin 75 is engaged by the catch 82, which retains the carriage $e$ and clamp and causes the opening of the interlacing-hook to release the thread, and thereafter the lever $d^2$ is given its final backward movement, hitting the dog 77 and turning the plate 80 to place the catch 82 in its dotted-line position, Fig. 36, thus placing it out of the range of the pin 75 as the lever $d^3$ is started forward for its full range of movement.

Figs. 55 to 71 show the different positions occupied by the thread in the formation of the knot.

In my patent, No. 263,031, I show loop-turners having their journals in spring-arms, which were objectionable because of the uncertainty of their movements, and the said turners, operated by mechanism such as shown in the said patent, could not be employed under a Λ-shaped table, and therein the greatest width of the opening between the adjacent faces of the said turners was at their heels, whereas for the best results the said turners should be equidistant from heel to point. In the said patent I described a loop-receiver; but it was without a joint, so that it could not work with a Λ-shaped table, and its prongs were straight and of equal length rather than curved and of unequal length, and to turn the loop over for the formation of a square knot the so-called "tension-needle" had to be brought into operation to feed the free end of the thread forward. The said patent did not show or describe a loop contractor or retainer, which are essential to insure rapid work. The interlacing-hook of the peculiar construction herein shown enables the free end of the thread to be left materially shorter beyond the knot, thus enabling me to do away with an under cutter.

I have herein shown three hooked needles, but desire it to be understood that needle $n^2$ may be dispensed with, if desired; or additional needles like it may be added.

I do not desire to limit my invention to the exact devices employed to operate the needles or the mechanism which co-operates in the formation of the knot. The prongs 90 are placed on the loop-turners to prevent the loop from spreading too far apart. All the levers F', G', P, I', and J' have their fulcra in common on the rod 95. These levers are shown in dotted lines, Figs. 41 to 45, inclusive.

I claim—

1. In a pamphlet-stitching machine, a series of hooked needles, and means, substantially as described, to operate them singly and in succession, and a vibrating thread-carrier to present thread to the hooks of the said needles on opposite sides thereof, and mechanism to reciprocate the thread-carrier a variable distance, according to the length of stitch, combined with a table to support the pamphlet, the said table being provided with a slot equal in length to the distance between the extreme needles, substantially as described.

2. In a pamphlet-stitching machine, a Λ-shaped table having one of its sides pivoted, means for locking said slide at different inclinations, and a slot in said table at the pivotal line, combined with a slotted presser having a detachable foot corresponding in shape to that of the table, substantially as described.

3. In a pamphlet-stitching machine, a Λ-shaped table, one part or side of which is pivoted or hinged to be lifted into horizontal position, and means for locking it in either position, combined with a presser to act upon a pamphlet placed on the said table, substantially as described.

4. The reciprocating thread-carrier, the series of hooked needles, and means, substantially as described, to operate the same, and means to vibrate the thread-carrier to present the thread on opposite sides of successive needles, and the slotted table, combined with the slotted presser, the bar $H^7$, adapted to slide in the under side thereof, and means to move it across the slot over which the loop drawn down by the end needle $n^4$ is drawn when tightening the stitch, substantially as described.

5. The thread-carrier, the series of hooked needles, means, substantially as described, to operate them, and the slotted table, combined with the slotted presser provided with the movable rest $H^7$ and slide-bar $H^5$, each adapted to be moved across the slot in the presser to support the thread and prevent it from cutting into the paper, as set forth.

6. In a pamphlet-stitching machine, the slotted presser and actuating-pins thereon to open and close a pivoted blade, combined with the slide-bar $H^5$, the blade $H^6$, pivoted at its outer end, one end of said blade being extended between said pins, and with mechanism to move the slide-bar and pivoted blade across the slot, the pivoted blade at such time being closed by the action of one of said pins, substantially as described.

7. The table, the presser, its pivoted carrying-yoke having the slotted ear H' and the slide-rod provided with the projection 29, and the spring to move the slide-rod, combined with the cam to operate the slide-rod to lift the presser, substantially as described.

8. The rod $D^4$, the carriage of the thread-carrier, the hub 16, and lever $D^2$, connected therewith, combined with the slotted lever D', the adjustable block 10 in the slot thereof, and the link to connect it with the lever $D^2$ and pivoted thereto, the pivot forming the center of curvature of the slot in the lever D', whereby the lever $D^2$ and carriage of the thread-carrier may always be moved back to the same starting-point and forward for a greater or less distance, according to the length of stitch, substantially as described.

9. The sliding carriage $D^3$, combined with the thread-carrier having the rigid hook 17 and arm 18 pivoted thereon, and spring to operate upon one end of the arm 18 to clamp the thread, substantially as described.

10. The series of hooked needles, the slotted table, the rod $D^4$, the carriage for the thread-carrier splined thereon to slide freely longitudinally, but to rotate with said rod, the thread-carrier, and means, substantially as described, to reciprocate the said carriage on the rod to present the thread to the successive needles, a rocking lever connected at one end to the rod, and a cam to rock said lever to vibrate the rod and therewith the thread-carrier to present the thread on opposite sides of the adjacent needles, substantially as described.

11. The series of hooked needles, the slotted table, the rod $D^4$, sliding carriage for the thread-carrier mounted and splined thereon, the carriage for the thread-guide mounted loosely on the said rod, and the thread-guide E and its detachable end 24 on the said carriage, combined with means, substantially as described, to slide the carriage for the thread-carrier and with means to partially rotate the said rod and with it the said carriage, whereby the thread is correctly presented to the hooks of the needles in the proper succession, substantially as set forth.

12. The rod $D^4$, the thread-guide E, mounted thereon loosely, and the lever $D^6$, fast to the said rod, and the arm 23 of said lever adapted to engage the thread-guide, combined with means, substantially as described, to operate the said lever and its arm to move the thread-guide in one direction, and with a spring to move the thread-guide in opposition to the movement imparted to it by the arm 23 of the lever $D^6$, substantially as described.

13. The table, thread-carrier, hooked needle $n$, and operating mechanism therefor, combined with the loop-spreader 54, provided with a hole to operate as a cast-off, and a movable frame to carry the said spreader into the loop, and a retaining-spring, into contact with which said spreader is moved, substantially as described.

14. The hooked needle and operating mechanism therefor, and the loop-spreader provided with an opening 59 to act as a cast-off, combined with a spring 58 to detain the loop cast off by the needle, substantially as described.

15. The thread-carrier, table, and hooked needle $n$, operating mechanism therefor, and a loop-spreader, combined with the loop-contractor and movable frame upon which it is mounted, the said contractor having prongs, substantially as described, and embracing the loop drawn down by needle $n$ and before the said loop is cast off the loop-spreader, as set forth.

16. The thread-carrier, table, and hooked needle $n$, and loop-receiver having curved prongs and shoulders thereon to hold the loop, combined with the loop-turners and with means, substantially as described, to operate the said needles, loop-receiver, and loop-turners to form the loop and thereafter to raise the loop-receiver and enlarge the loop, substantially as described.

17. The loop-receiver 53 and the lever 60, upon which it is pivoted, combined with means, substantially as described, to operate the said loop-receiver, as set forth.

18. The loop-receiver 53, the lever 60, upon which it is pivoted, and operating mechanism therefor, combined with the fixed loop-detainer 66 to prevent the passage of the loop too far back upon the loop-receiver before the latter is raised to enlarge the loop, substantially as described.

19. The frame, the shaft $J^6$ thereon, the loop-turners mounted loosely on the said shaft and free to slide thereon longitudinally, and having cam-slotted hubs $a'$ and fixed studs $a^3$ to enter in the said hubs, combined with means, substantially as described, to rotate the said shaft and loop-turners, the hubs of the latter at such time sliding longitudinally on the said shaft, substantially as set forth.

20. The loop-turners, their carrying-shaft, pinion thereon, frame $J^7$, mounted on shaft $J^8$, the segmental lever $J^3$, mounted loosely thereon, and the spring 49 to connect the said lever and frame, combined with a stop 52 for the frame and with means, substantially as described, to positively actuate the said lever to move the frame through the intervention of the spring, and when the frame is stopped thereafter turn the said shaft and the loop-turners, substantially as described.

21. In a pamphlet-stitching machine, a thread-carrier and hooked needle $n$, the slotted $\Lambda$-shaped table, the pivoted frame $J^7$, placed under it, the shaft $J^6$, mounted in the said frame, the loop-turners, and the loop-receiver, and pinion on the said shaft, and the loop-spreader and loop-contractor attached to the said frame, combined with means, substantially as described, to operate the said needle, the frame, and the loop-turners to manipulate the loop drawn down by the needle $n$, substantially as set forth.

22. In a pamphlet-stitching machine, the interlacing-hook slotted transversely at one side, as shown, to form a beak, and provided with a clamp $c^3$, having an enlarged head and free to slide in the body of the said hook to clamp the thread directly between itself and the said beak, combined with means, substantially as described, to operate the said clamp, substantially as set forth.

23. The interlacing-hook provided with the sliding clamp, the pin 75, made movable therewith, and means, substantially as described, to reciprocate the said interlacing-hook, combined with the table, and a stop to arrest the movement of the clamp before the body of the interlacing-hook comes to rest to thereby open the interlacing-hook for the reception of the thread, and a pivoted stop operated by the clamp to open the same and release the thread at the completion of the stitch, substantially as described.

24. The interlacing-hook cut transversely at one side to provide a beak and grooved near the said beak at its side, combined with a longitudinally-sliding clamp having an enlarged head to fit in said transverse cut and provided with a projection to enter the said groove and form a bridge to prevent the beak catching a loop as the interlacing-hook acts to draw the thread through a loop in itself, substantially as described.

25. The interlacing-hook provided with the sliding clamp, means for operating it and the connected pin 75, and the pivoted plate 80, and its pivoted spring-controlled catch, combined with means, substantially as described, intermediate said clamp and plate to turn the said plate on its pivot to place the catch into and out of the range of the pin, to operate substantially as described.

In testimony whereof I have signed my name to this specification in the presence of two subscribing witnesses.

STERLING ELLIOTT.

Witnesses:
 G. W. GREGORY,
 W. H. SIGSTON.